US008290923B2

(12) United States Patent
Kurapat et al.

(10) Patent No.: US 8,290,923 B2
(45) Date of Patent: Oct. 16, 2012

(54) PERFORMING LARGE SCALE STRUCTURED SEARCH ALLOWING PARTIAL SCHEMA CHANGES WITHOUT SYSTEM DOWNTIME

(75) Inventors: Kaushal Kurapat, San Jose, CA (US); Robert Marshall, Santa Clara, CA (US); Kenneth Yung, Milpitas, CA (US); Hongbin Qi, San Jose, CA (US); Mike Guangyu Cao, San Jose, CA (US); Alan Wada, Mountain View, CA (US); Ryan Edmund Sue, Fremont, CA (US); Xuejun Wang, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 680 days.

(21) Appl. No.: 12/205,107

(22) Filed: Sep. 5, 2008

(65) Prior Publication Data

US 2010/0076947 A1    Mar. 25, 2010

(51) Int. Cl.
*G06F 17/30* (2006.01)
(52) U.S. Cl. .................................................... 707/706
(58) Field of Classification Search .................. 717/706; 707/706, 711, 999.003
See application file for complete search history.

(56) References Cited

U.S. PATENT DOCUMENTS

| | | | | |
|---|---|---|---|---|
| 5,345,586 | A | * | 9/1994 | Hamala et al. ........................ 1/1 |
| 5,983,220 | A | | 11/1999 | Schmitt |
| 7,080,059 | B1 | * | 7/2006 | Poston et al. .................. 707/769 |
| 7,509,303 | B1 | * | 3/2009 | Chen ..................................... 1/1 |
| 7,603,367 | B1 | | 10/2009 | Kanter et al. |
| 7,743,078 | B2 | * | 6/2010 | Azvine et al. .................. 707/803 |
| 7,870,117 | B1 | * | 1/2011 | Rennison ...................... 707/706 |
| 7,912,823 | B2 | | 3/2011 | Ferrari et al. |
| 2001/0051946 | A1 | * | 12/2001 | Nishikawa ..................... 707/100 |
| 2002/0055932 | A1 | * | 5/2002 | Wheeler et al. ............. 707/104.1 |
| 2002/0070953 | A1 | | 6/2002 | Barg et al. |
| 2002/0091677 | A1 | * | 7/2002 | Sridhar .............................. 707/2 |
| 2002/0138353 | A1 | * | 9/2002 | Schreiber et al. ............... 705/26 |
| 2003/0195877 | A1 | | 10/2003 | Ford et al. |
| 2003/0208399 | A1 | | 11/2003 | Basak et al. |

(Continued)

OTHER PUBLICATIONS

International Searching Authority, "International Search Report and Written Opinion", PCT/US2009/055771, dated Mar. 3, 2010, 11 pages.

(Continued)

*Primary Examiner* — Kimberly Wilson
*Assistant Examiner* — Mohammed R Uddin
(74) *Attorney, Agent, or Firm* — Hickman Palermo Truong Becker Bingham Wong LLP; Edward A. Becker

(57) ABSTRACT

A method and apparatus is provided for hosting within a search engine, large-scale heterogeneous repositories of searchable and navigable content. Customers of the hosting platform are customers wanting to outsource the management of their searchable content. Content domain experts from each customer independently define a taxonomy of categories and attributes for their structured content that form a hierarchical set of nodes (a directed graph) that are mapped to a common physical search engine infrastructure. The mapping algorithm that maps unique attributes across potentially very different subject domains onto the same physical infrastructure is introduced. Once the physical structure is created, the search engine can use it for searching or navigating just within one customer's domain or users can search across multiple customer domains. When a customer makes changes to the logical structure, each individual change is categorized as compatible and incompatible, and executed in different time frames based on the amount of disruption it will require to the operational system.

30 Claims, 10 Drawing Sheets

U.S. PATENT DOCUMENTS

| | | | |
|---|---|---|---|
| 2004/0003003 A1* | 1/2004 | McCartney et al. | 707/200 |
| 2004/0010506 A1 | 1/2004 | Wang | |
| 2005/0050068 A1* | 3/2005 | Vaschillo et al. | 707/100 |
| 2005/0060287 A1* | 3/2005 | Hellman et al. | 707/2 |
| 2005/0222987 A1 | 10/2005 | Vadon | |
| 2005/0256865 A1* | 11/2005 | Ma et al. | 707/5 |
| 2006/0195421 A1 | 8/2006 | Kilroy | |
| 2006/0195427 A1* | 8/2006 | Kilroy | 707/3 |
| 2007/0078873 A1* | 4/2007 | Avinash et al. | 707/101 |
| 2007/0168316 A1* | 7/2007 | Gupta et al. | 707/1 |
| 2007/0168331 A1 | 7/2007 | Reddy et al. | |
| 2007/0168336 A1* | 7/2007 | Ransil et al. | 707/3 |
| 2007/0198501 A1 | 8/2007 | Sundaranatha | |
| 2007/0288438 A1 | 12/2007 | Epstein | |
| 2008/0066080 A1 | 3/2008 | Campbell | |
| 2010/0076952 A1 | 3/2010 | Wang et al. | |
| 2010/0076979 A1 | 3/2010 | Wang et al. | |

OTHER PUBLICATIONS

Claims, PCT/US2009/055771, 9 pages.

\* cited by examiner

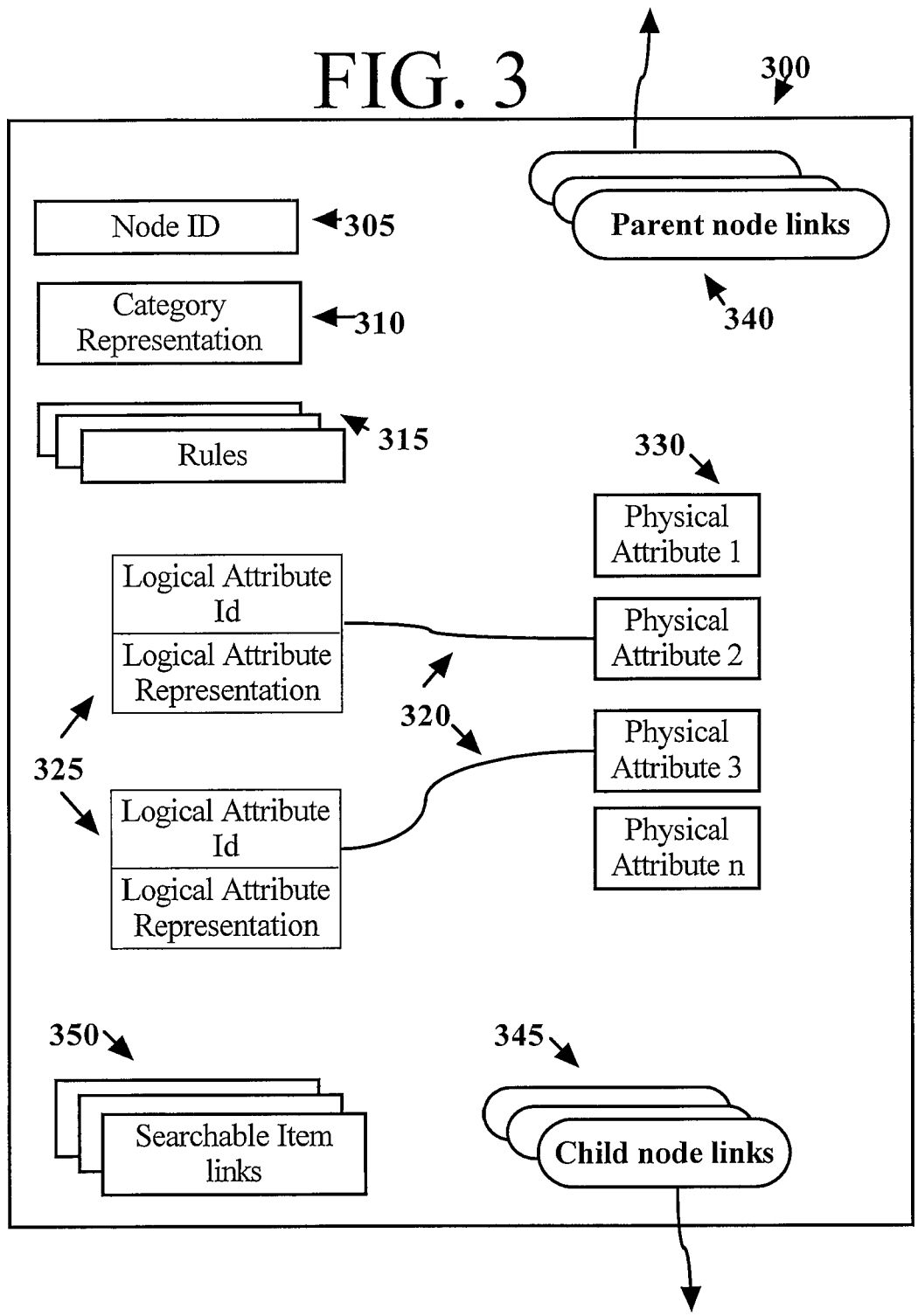

PERFORMING LARGE SCALE STRUCTURED SEARCH ALLOWING PARTIAL SCHEMA CHANGES WITHOUT SYSTEM DOWNTIME

CROSS REFERENCE TO RELATED APPLICATIONS

This application is related to U.S. patent application Ser. No. 12/242,272 filed on Sep. 30, 2008 entitled "Self Contained Multi-Dimensional Traffic Data Reporting and Analysis in a Large Scale Search Hosting System" and U.S. patent application Ser. No. 12/264,790 filed on Nov. 4, 2008 entitled "Performing Search Query Dimensional Analysis on Heterogeneous Structured Data Based on Relative Density;" the contents of all of which are incorporated by this reference in their entirety for all purposes as if fully set forth herein.

FIELD OF THE INVENTION

The present invention relates to search engines, and in particular to hosting multiple heterogeneous data repositories of searchable content in a common search engine.

BACKGROUND

A search domain is a self-contained set of information pages, usually specific to a subject or function. Frequently, web sites that provide searching functionality are directed to a specific search domain. For examples, a web site for shopping may allow searching in the "product" domain, a web site for downloading music may allow searching in the "music" domain, a web site focused on medical information may allow users to look up medical information, and a financial web site may allow users to search for products or services relating to managing finances. Typically, at each of these sites, the information pages, together with structure and indexing information, are stored in a data repository.

Search engines may be used to index a large amount of information. Web sites that include search engines typically provide an interface that can be used to search the indexed information by entering certain words or phrases (keywords) to be queried. The information indexed by a search engine may be referred to as information pages, content, or documents. These terms are often used interchangeably.

A searchable item is a logical representation of an information page or piece of content that is maintained within a search engine platform. Search engines help users to locate searchable items. Sometimes a searchable item represents an electronic document, such as a white paper, or content, such as a video that can be viewed by streaming it over a network connection or downloaded to a computer system for local viewing. Other times, the searchable item is a description and representation of something in the real, physical world, such as a person, or a product for sale. Searchable items can be descriptions of electronic or physical items.

Search engines may analyze the searchable items within a repository, extracting categorization information and constructing indexes that are used to find relevant data when a search is requested. Using a search engine, a user can enter one or more search query terms and obtain a list of search results that contain or are associated with subject matter that matches those search query terms. When a user performs a search, the set of pages found during the search and presented to the user along with other search and navigation hints are called the "search results." Each page listed in the search results is called a "hit." When a user selects a content page for viewing, that event is called a "click" because usually, though not always, the selection is specified by clicking a mouse button.

In addition to storing representations of content and responding to user requests to find content, a search engine platform must be able to respond appropriately when the organization of the content repository changes.

One example of a search engine is a vertical domain search engine. A vertical domain search engine provides searching over a specific search domain. Examples of vertical domain databases include search engines that provide searching a legal or a medical database of information. Within each of these examples, the content searched for has a common subject (law or medicine, respectively) and is assigned categories and attributes relevant to the subject matter by domain experts who manage the content. For example, categories supported by a law search engine might include State or Federal Case Law, State or Federal Statutes, Treatises, Legal Dictionaries, Form books, etc. with attributes such as publication date, legal topic, history, etc. A medical search engine might have categories of Symptoms, Diagnostic procedures, Treatments, and Drugs. Attributes might include parts of the body affected and have potential values such as respiratory, circulatory, nervous system, etc. The repository for both vertical domains is highly structured within each system, but the structure for each domain is different from the structure of domains pertaining to different subject matter.

When a search domain is managed in isolation from other domains, it is convenient to take advantage of a commercial database management system for storing, searching, and maintaining the content, for several reasons. First, the managed data is highly structured, and the structure is uniform across the domain. The structure of the data maps easily to a fixed database schema. Second, a vertical search domain typically does not require handling the same high volume of query traffic as a general, domain-independent search engine, and the number of different search queries can be constrained to the limited taxonomy of the domain. A problem faced by companies that own and operate vertical domain search engines is that in addition to having to manage the structure of the repository, the companies must also manage the search engine platform including database management. Domain experts are not necessarily experts in IT management which can be very complex.

Another example of a search engine is a general, domain-independent search engine. The World Wide Web (Web) provides access to millions of pages of information that are often poorly organized, and it can be difficult for users to locate particular Web pages that contain the information that is of interest to them. This kind of search engine must be extremely scalable, with the ability to handle millions of concurrent queries and hundreds of thousands of different queries. The Web pages indexed for use with this kind of search engine are not very structured, so there is no expectation of a common taxonomy for an arbitrary collection of web pages.

Whether or not a commercial database is used for storing a data repository, it is common for modern search systems to operate using at least two parallel search repositories for searching. Whenever a change is made in the structure of the repository, system downtime is required. One of the parallel systems is taken offline and totally re-indexed. Once the changed repository comes back online, another system is taken offline and similarly modified.

To avoid the need for each company to maintain its own vertical search engine, multiple companies may try to combine their search engines. For example, combining a legal search engine with a medical search engine may be attempted, so that a user searching for information on medical malpractice would find content from both with one search request. One way this could be done, would be to define a common database schema to be used across all vertical domains and incorporate all domain repositories into the same database. The new schema would have a place for each unique attribute in the union of attributes across all hosted domains. Given a very large domain and/or many hosted domains, there could be millions of unique attributes required in the unified data schema. Such an approach would not be scalable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements.

FIG. 3 is a diagram showing a logical view of node in the hierarchy.

DETAILED DESCRIPTION

Figure 1A:
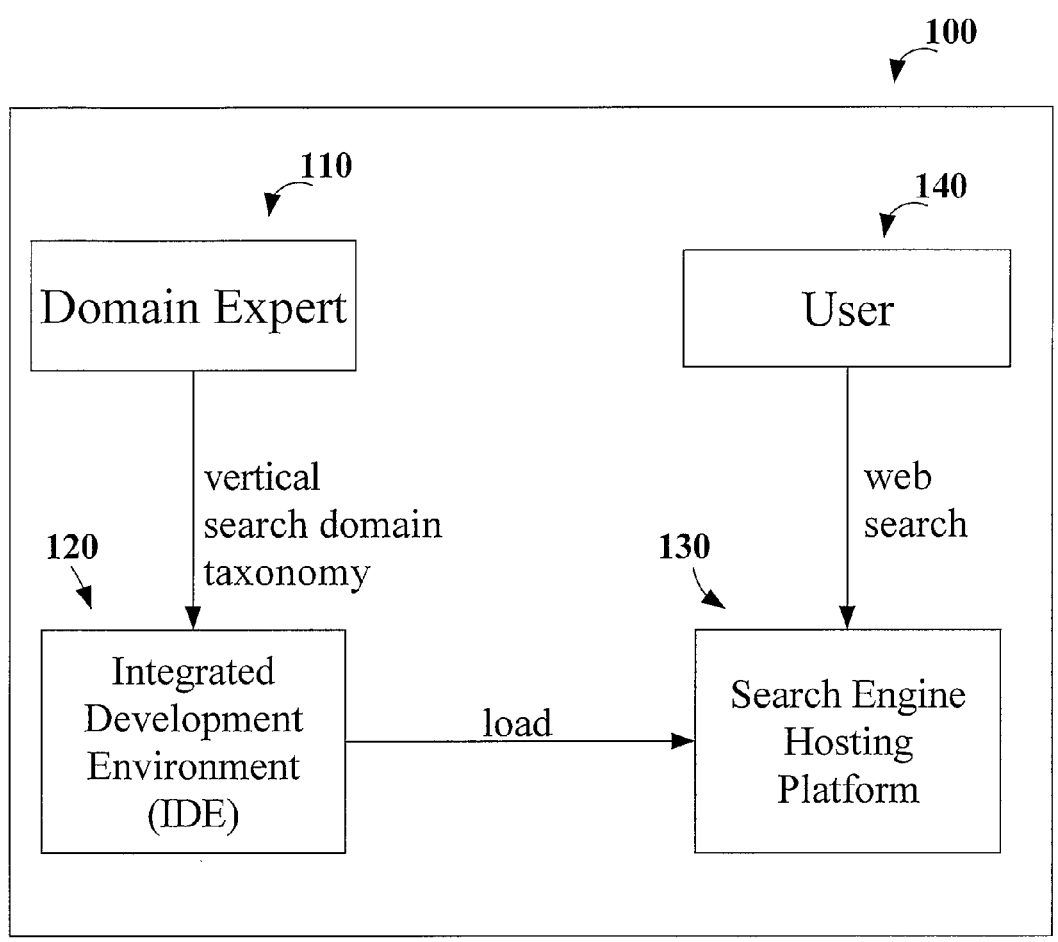
FIG. 1A is a block diagram show the relationship between the vertical domain development environment and the operational search engine environment.

An approach is described for providing a scalable domain hosting solution that can host various heterogeneous vertical domain search repositories with the ability to search across these domains and provide a consistent way to define and maintain the taxonomy of the domains, and respond to changes in the taxonomy with minimal disruption to users of the search engine service.

In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various aspects of the invention are described hereinafter in the following sections:

Domain Content Repositories in a Common Hosted Platform

There are numerous obstacles to combining multiple vertical search engines into a single hosted search engine platform. As mentioned above, combining vertical search systems by constructing a database schema that supports all attributes of all types of heterogeneous items is not scalable. Further, the owners of the hosted search repositories will typically want the ability to evolve the structure of their respective repositories based on their changing needs. Adding or deleting categories or attributes of categories can often require reorganizing the repository, which can require taking the system offline, resulting in the potential disruption to user searches while changes are being made. In a platform that hosts multiple vertical search repositories, taking the system down every time the owner of one of the vertical search repositories wants to change the structure of the owner's repository would not be practical.

Most general search engines are optimized for fast response times and the ability to handle a very large traffic volume. To achieve this, search engines use indexes over a fixed and manageable number of attributes. As shall be explained in greater detail hereafter, techniques are provided for the attributes of heterogeneous vertical domains to be represented within the existing search engine infrastructure in order to take advantage of both the speed and breadth of the general search platform, and the guided navigation capabilities enabled by the use of structured data belonging to a vertical domain. Furthermore, once the search engine platform is created, changes to any of the vertical search repositories that are hosted by the search engine platform must be handled with a minimum of disruption to the users that are depending on the search engine for finding information in the domains that the platform hosts.

As shall be described in greater detail hereafter, a search engine platform is provided for searching over multiple vertical domain repositories whose content is heterogeneous in structure and semantics. In one embodiment, the vertical search repositories are represented as subgraphs within a node hierarchy. The owners of the vertical search repositories are able to evolve the structure of their repositories, and the changes are propagated to the hosted platform in a manner that reduces the downtime of the platform.

In one embodiment, the platform maps the logical attributes of the searchable items in each repository to a number of physical attributes that are indexed by the platform. The mapping of logical attributes to physical attributes is many-to-one, so that the number of logical attributes across all of the hosted vertical engines may greatly exceed the number of physical attributes that are indexed by the platform. In addition, the mapping of logical attributes to physical attributes is performed in a manner that reduces the likelihood that future structural changes to vertical search repositories will require changes to the mapping of logical attributes to physical attributes.

Representing Vertical Search Repositories in a Node Hierarchy

According to one embodiment, building such a heterogeneous search engine involves constructing a hierarchy that is a directed graph of nodes similar to a tree. The nodes of the hierarchy represent elements of the logical search repositories that are hosted by the platform. One embodiment of such a hierarchy is illustrated in FIG. 2.

Figure 2:
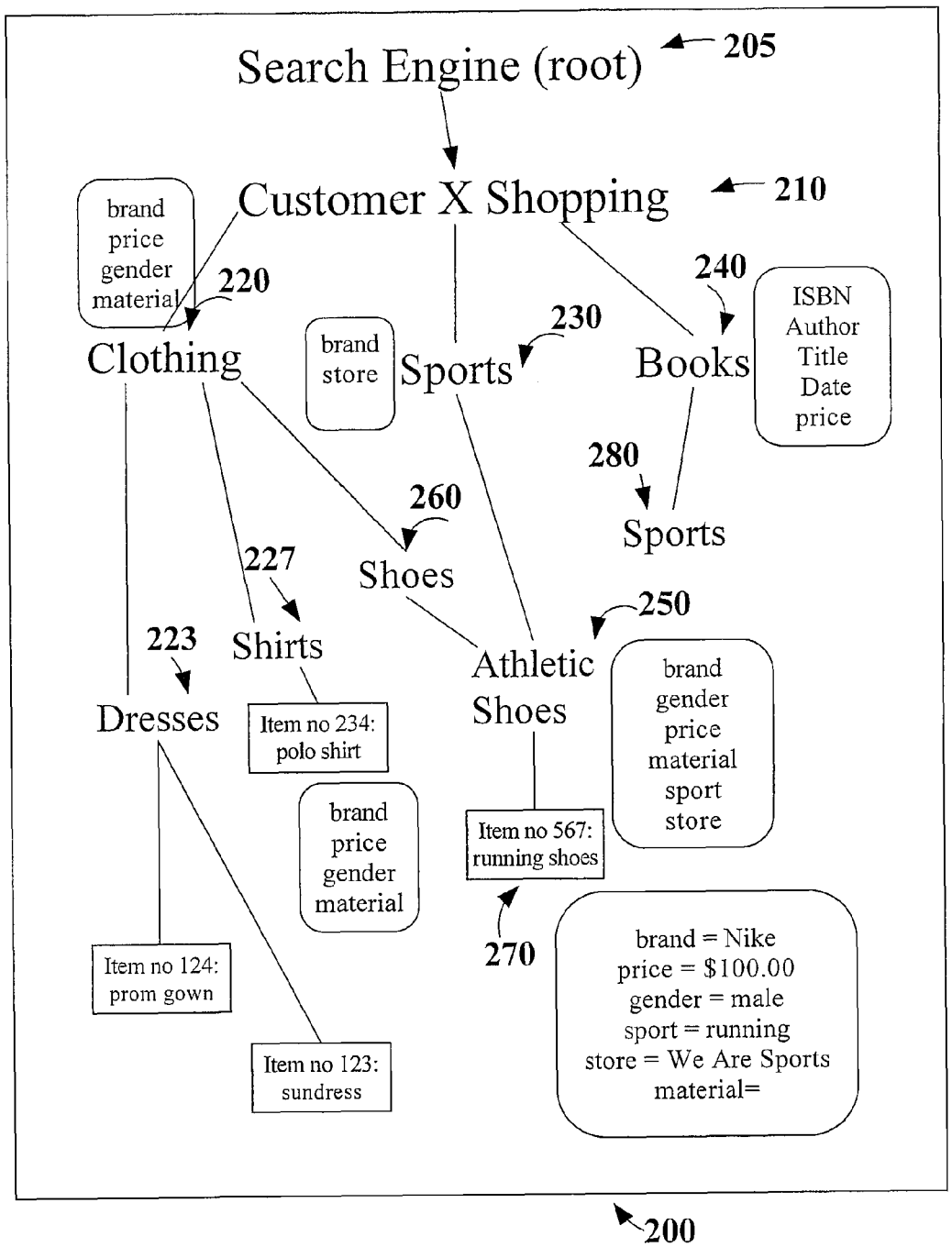
FIG. 2 is a diagram showing a logical graph structure where the nodes of the graph represent categories specific to a domain.

Referring to FIG. 2, the root of the hierarchy represents the global search engine, and has no parents. Multiple repositories can be represented in the overall search space, each repository represented by a subgraph of the overall hierarchical structure. In one embodiment, each node other than the root represents a category, and is therefore referred to herein as a category node. Category nodes within a vertical search space represent classifications of the search items. For example, a category node of clothing might have children category nodes including dresses, pants, skirts, etc. Category nodes towards the top of a tree are more general than their children category nodes which provide refinement.

The terminology used to describe the relationships of nodes is the same as for general hierarchies. If node 1 is a descendent of node 2, then there is a path following links between the root and node 1 that contains node 2. If node 1 is a descendant of node 2, then node 1 is said to descend from node 2. Nodes may be the root of a subgraph which includes the node and all of its descendents.

Unlike a tree, nodes in the directed graph may have more than one parent node. Thus, one category node may descend from other category nodes that have no direct relationship with each other. For example, a category that represents athletic shoes may descend from both a "Shoe" category and a "Sports" category.

Searchable Item Records

According to one embodiment, each searchable item of a vertical search repository is represented by a searchable item record. The searchable item record for a particular searchable item may be linked to one category node to which the particular searchable item belongs. In an alternate embodiment, a searchable item record may be linked to more than one category node. Linking a searchable item to a category may be achieved by storing a link in the node to the searchable item record, and optionally the category to which a searchable item is linked is recorded in the searchable item record. Alternatively, the searchable item record may contain a link to the category node to which it is linked. For example, the searchable item record for a particular jacket may be linked to the node that represents the "jackets and coats" category. Optionally, the searchable item record may contain a link to, or other indication of, all of the categories that apply to the item. In other words, the searchable item record may be tagged with all of the ancestral categories of the node to which it belongs.

All searchable item records of the subgraph linked to the dresses category node represent searchable items related to dresses in some way, depending on the vertical domain subject matter. For a shopping domain, searchable items belonging to the category shirts probably represent a piece of clothing for sale. Within a theatrical domain, searchable items belonging to category shirts might represent information on costume design.

In addition, searchable items contain a set of attribute name/value pairs. The type of a searchable item is defined by the set of attributes for which attribute values may be specified within the searchable item.

Attributes

According to one embodiment, each category has associated attributes that are relevant to that category. For example, attributes relevant to clothing might include, for example, size, gender, price, and color. The attributes of a category node are inherited by their children nodes. Thus, in the example, because a shirt is a kind of clothing, all the attributes of the clothing category (e.g. size, gender, price, and color) apply to the shirt category. All searchable items have all the attributes of the category node to which the searchable items are attached (which, as explained above, includes all of the attributes of ancestor nodes of that category node). An attribute, together with the value of the attribute, is called an attribute/value pair. Thus, any given searchable item may be associated with multiple attribute/value pairs. For example, a particular shirt may be associated with the attribute/value pairs: (size, 14), (gender, male), (price, $20), (color, red), etc.

Multiple Parents

Nodes may have multiple parents. Thus, a Sports Apparel category node may be the child of both a Sports category node and a Clothing category node. A node with multiple parents inherits the union of the parents' attributes. For example, the Books category might have attributes ISBN number, author, title, and price. Price may be an attribute of both Clothing and Books, and would show up as one attribute in the union of {size, gender, price, color, ISBN number, author, title}.

Customers, Experts, Hosts, and Users

Customers of a search engine hosting service typically own content for one of the vertical search repositories hosted by the platform. Such customers want users to be able to use the platform to search for and find that content. However, even though customers delegate the responsibilities of maintaining a search engine to the search engine hosting service, the customers will typically still want to retain control over managing the taxonomy of their repository hierarchy.

In the approach described herein, a domain expert who understands the structure of the searchable content and desired ways of searching for and navigating through it, acts on behalf of the customer. A user uses the search engine to find desired content in that domain and in other domains hosted in the same search engine platform.

FIG. 1A shows the relationships among domain experts, users, and the hosting search engine platform. Referring to FIG. 1A, a User 140 can be a person using a search engine user interface to perform searches or navigate through the content, or a user can be a program that is written to invoke a programmatic interface for searching and/or navigating on behalf of a person. Note that because multiple customers outsourcing their search environment can share the same physical storage, a User 140 can search for content across multiple customers' content.

Obtaining Customer Content

Figure 1B:
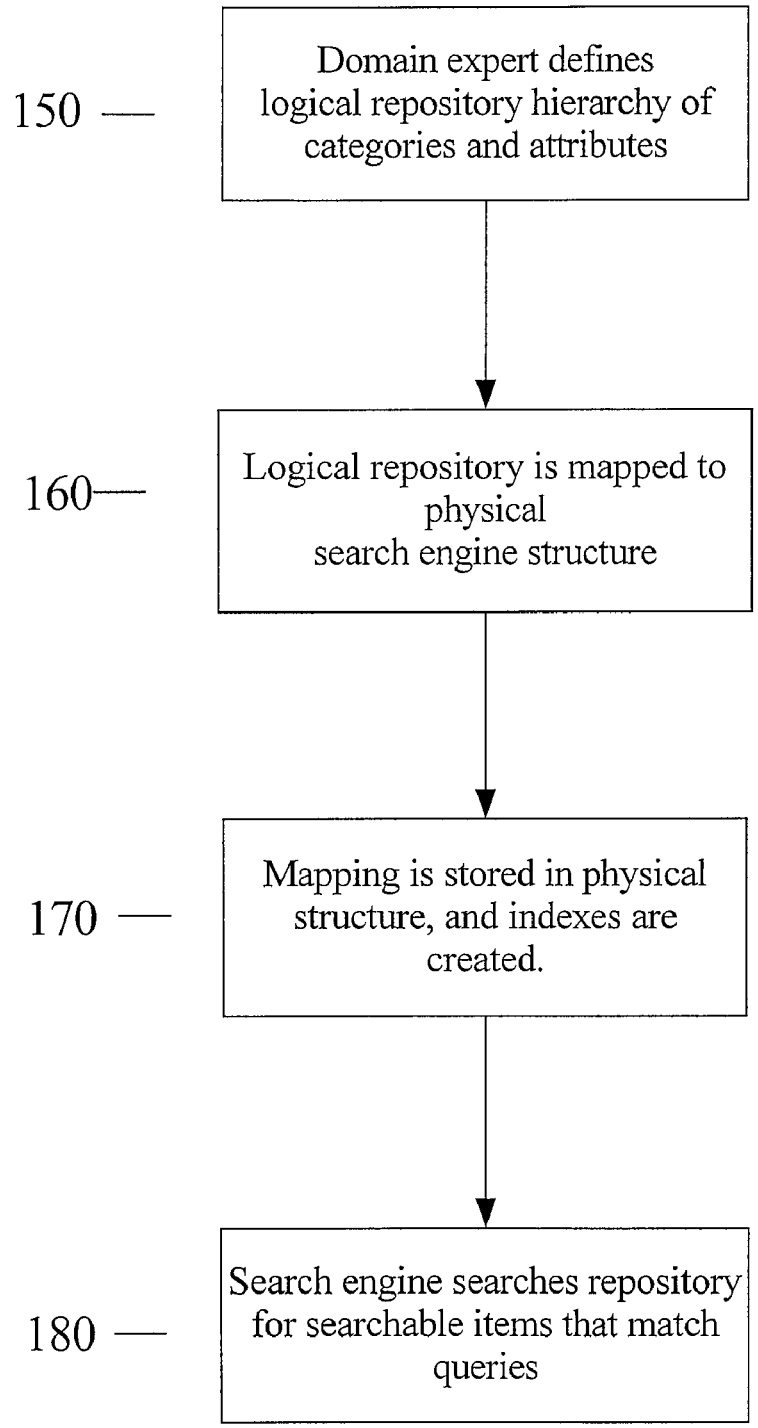
FIG. 1B is a flow diagram showing the steps of enabling a search engine environment to find searchable items from a repository.

FIG. 1B shows the process for getting customer content to be searchable on a search engine platform. In the embodiment illustrated, in FIG. 1B, Domain Experts (110) to define the logical hierarchy of categories and attributes that represent their repository and how it can be searched (Step 150). A Domain Expert 110 can interact with an Integrated Development Environment (IDE) 120 that provides a graphical user interface (GUI) or alternatively, a Domain Expert 110 may upload a definition of the hierarchy constructed in some other way. The Domain Expert 110 defines a logical hierarchy comprising of categories, logical attributes, and the relationships among them. For example, transportation->cars->convertibles->classic cars might be one category hierarchy that a Domain Expert 110 would choose. Hobbies->classic cars->convertibles might be another. The way in which the category hierarchy is defined determines how users can browse through the content. Logical attributes are a type of information associated with a category that is common across a subset of a category hierarchy. For example, model year might be an attribute of cars, convertibles, and classic cars, but not of transportation or hobbies.

Once the Domain Expert 110 is finished defining the category hierarchy, the hosting service is responsible for translating the logical description of the content structure into the physical structure of the Search Engine Hosting Platform 130 that can be accessed by the search engine (Steps 160, 170). A mapping from the logical description to the physical storage is computed (Step 160), then the mapping and the computed indexes are stored in the physical structure (Step 170). Once loaded into the physical hosting platform, a User 140 can interact with the search engine to find desired content (Step 180).

Defining the Hierarchy

FIG. 2 shows an example of the logical representation of a customer's searchable content 200. In this example, the customer's searchable content is products for sale. The root of the hierarchy is the virtual search engine node 205. The root node is virtual because this node is not indexed. The root is a parent of all of the top level subgraphs, each of which can represent a distinct repository. There are three rules imposed on the logical hierarchical structure. First, there no cycles allowed in the graph. Thus, a node cannot both descend from, and be an ancestor of, the same other node.

Second, there is a single configurable maximum limit on the number of logical attributes that may be associated with any given node, and that number must be less than or equal to the number of physical attributes that are indexed by the platform. For example, if the platform indexes a maximum of 20 physical attributes and a particular category node is associated with 15 logical attributes that are mapped to 15 of the 20 physical attributes, then category nodes that descend from that particular category node may define, at most, five additional logical attributes. The limit on the total number of attributes that can be associated with any given node ensures that for every node, there is a mapping for each logical attribute of the node to a different physical attribute of the platform.

In the example illustrated in FIG. 2, Customer X Shopping 210 is the top-level node of the subgraph representing a content repository. Directly under the top-level node 210, are the top-level categories, Clothing 220, Sports 230, and Books 240.

The rounded rectangles next to some of the nodes shown in FIG. 2 contain example attributes associated with the node. The attributes associated with Clothing 220 include brand, price, gender, and material. All nodes in the subgraph rooted at Clothing 220 will have at least this set of attributes, and therefore, all searchable items of Clothing will contain at least these attributes. Notice, however, that the category Sports 230 only has one attribute, brand. Brand means the same thing with respect to sports as it means to with respect to clothing. Consequently, the brand attribute of Clothing is "semantically identical" to the brand attribute of Sports. Category Books 240, on the other hand, has no attributes in common with Sports 230, either in name or in meaning. Thus, all of its attributes are "semantically different" or distinct from the attributes of Sports 230.

Athletic Shoes 250 is a child node of both Shoes 260 and Sports 230, and must inherit all the attributes of both parents. Athletic Shoes 250 inherits the brand, price, gender, and material attributes from Shoes 260 (which inherited these attributes from Clothing 220). Athletic Shoes 250 also inherits the store attribute from Sports 230, and also has a new attribute sport assigned to its own node that all of its children will inherit.

The searchable item records of the hierarchy are the searchable items, which in this example are the product descriptions. The searchable item representing Item no 567 (270) is a particular kind of running shoe for sale that is linked to the Athletic Shoes 250 category. Thus, the searchable item 270 may specify values for each of the attributes of Athletic Shoes 250. Searchable item 270 has attribute values specified for most of the attributes. In this example, Item no. 567 (270) is a men's Nike brand running shoe that sells for $100 at the We Are Sports store.

Rule Inheritance

In addition to attribute inheritance, the node hierarchy may also provide rule inheritance. A set of rules is stored in association with each category and determine the behavior of the search engine with respect to that category. In one embodiment, the rules represent instructions on how to influence the relevancy of search results. Rules may be used to control several aspects of the search engine such as data processing and results presentation. A node may inherit the rules of its parent nodes as well as have rules directly assigned to it that may be inherited by the node's children.

Logical Structure of a Node

FIG. 3 shows a logical view of one embodiment of a category node 300. Node 300 contains Parent Links 340 and Children Links 345 that together represent the node's position in the hierarchy. The Category Id 305, also called a "node id" provides unique identification of the node in the hierarchy. A node also contains links to the Searchable Items 350 that link the node to the set of searchable items belonging directly to the category. A searchable item belongs to a category if the searchable item record is linked to the category node.

The Category Representation 310 is a way of identifying the category to a user. Category Representation 310 might be an icon or text, for example. In FIG. 2, the textual name "Athletic Shoes" is the category representation of node 300. Two different category nodes (different id's) could have the same Category Representation 310, but the categories would be considered different categories. For example, in FIG. 2, Books 240 has a child category node Sports 280 representing books about sports. Nodes 230 and 280 both have the same category representation: the textual name "Sports", but 230 and 280 are different nodes and thus are different categories.

A node has a set of rules 315 that define category policy. Some example rules are: the sorting method to be used for the values of an attribute, how many and which attributes should be listed in the navigation panel before a "see more" link is shown to see the rest, and how many search results (aka searchable items) should be displayed per page in response to a query.

A node has a set of Logical Attribute Id's 325 that are relevant to the category of the node. Preferably, each logical attribute id in the system has a distinct semantic meaning. A logical attribute id has associated with it a representation for the user, Logical Attribute Representation. Even if different logical attribute id's were to have the same user representation, the logical attributes would be considered semantically different from each other. Conversely, different nodes that have the same associated attribute id's may use a different user representation for the same attribute id. For example, "price" may be the user representation for a logical attribute associated with one category, and "cost" may be the user representation for that same logical attribute in a different category.

Preferably, each of the Logical Attribute Id's 325 has a mapping 320 to single Physical Attribute 330. For example, assume that (1) category X has an attribute A, and (2) category Y has an attribute B that is semantically identical to attribute A of category X. Under these conditions, attributes A and B would have the same logical attribute id. Because attributes A and B have the same logical attribute id, both attributes A and B should be mapped to the same physical attribute.

However, if there is no direct relationship between categories X and Y, it is possible for attributes A and B to be mapped to different physical attributes. As shall be explained in greater detail below, if attributes A and B are semantically identical but have been mapped to different physical attributes, the mapping must be altered in response to any change that creates a hierarchical relationship between categories X and Y.

There are many ways that this logical representation of a node can be stored physically. One way is to store the node as a set of tables in a relational database. Another way is to represent each node as an in memory object. Still another way is to store the node information in an XML document.

Mapping the Logical Hierarchy to a Common Physical Structure

In one embodiment, the logical repository structure defined by the domain experts for use with the heterogeneous search platform is mapped into a physical storage structure used by the platform. Rather than using a fixed database schema that supports the various attributes of the various types of searchable items, all logical attributes for all types of searchable items are mapped to the same physical attributes.

Each logical attribute associated with a node is either inherited from one or more of the node's parents, or assigned to the node. If a logical attribute is assigned to a node, then the logical attribute is not present in any parent, but is inherited by the node's descendents. Regardless of how a logical attribute becomes associated with a node, a node "has a" logical attribute if the logical attribute is associated with it. Similarly, the phrase "logical attribute of a node" or "logical attribute for a node" refers to any logical attribute that is associated with a node.

Figure 4A:
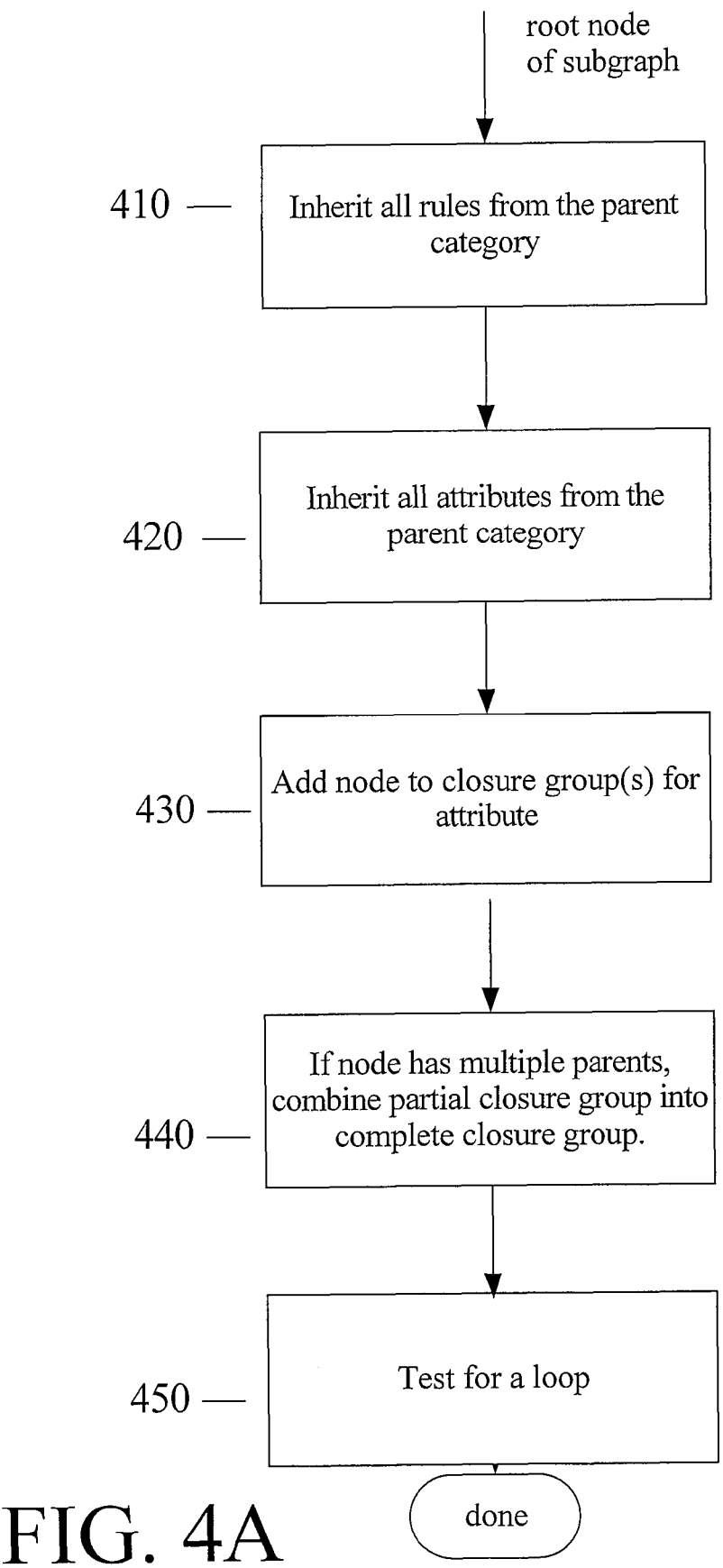
FIG. 4A is a flow diagram of the first pass of the mapping algorithm used when constructing the hierarchy of nodes representing a content repository.

FIG. 4A is a flow diagram showing how logical attributes are mapped to physical attributes, according to one embodiment of the invention. This process takes two passes through the hierarchy. The first pass is a depth-first search of the hierarchy that identifies closure groups. A closure group is a set of category nodes that are connected to each other and contain the same logical attribute. All nodes within a closure group are directly or indirectly connected to every other node in the closure group. Two nodes are connected under one of two conditions: 1) one node is an ancestor or descendent of the other node or 2) the two nodes share a common ancestor or descendant. A partial closure group is the group of nodes that descends from the first node to which an attribute is directly assigned. A complete closure group is formed when a node has multiple parents each having the attribute. The complete closure group may be formed by combining the partial closure groups to which each of the parents belongs.

At each node, the set of rules and attributes of the node's parents are inherited (Steps 410 and 420). For each attribute inherited or assigned directly to the node, the node is added to the corresponding partial closure group for that attribute. The corresponding partial closure group is defined by the node's ancestor which was first assigned the attribute (Step 430). If the attribute was directly assigned to the node rather than being inherited through parent nodes, create a new partial closure group for the attribute defined by the node. If a node has multiple parents, the node may be added to more than one closure group. In one embodiment, the node is added to each of the partial closure groups to which its parents have already been added for the attribute. When a node is added to more than one partial closure group, these partial closure groups are combined into a complete closure group (Step 440). In Step 450, a test is performed to ensure that there is not a loop in the graph.

For example, in FIG. 2, a partial closure group for the logical attribute brand would consist of the Clothing 220 node and all of the nodes in its subgraph. The Sports 230 node also has a logical brand attribute, and so all of the nodes in the Sports 230 subgraph belong together in a separate brand partial closure group. Because Shoes 260 and Sports 230 share a common descendant, Athletic Shoes 250, the union of all the nodes in the Shoes 260 and Sports 230 subgraphs are in the same complete closure group with respect to brand. All the nodes in subgraph Clothing 220 belong to that same group because Clothing 220 is an ancestor of Shoes 260, and Dresses 223 and Shirts 227 are descendants of Clothing 220. Likewise, Sports 230 belongs to this same complete closure group because node 230 is an ancestor of Athletic Shoes 250.

Not all nodes having the same attribute are placed in the same complete closure group. For example, if Books 240 had a logical attribute brand, Books 240 would not belong to the same brand complete closure group described above because there is no connection to the other nodes in that group for the following reason: the top level shopping node does not have a brand attribute, so the shopping node is not in the brand groups. Thus, Books 240 and Sports 230 do not share a common ancestor or a common descendant with respect to the brand group. The same is true for Books 240 and Clothing 220.

Figure 4B:
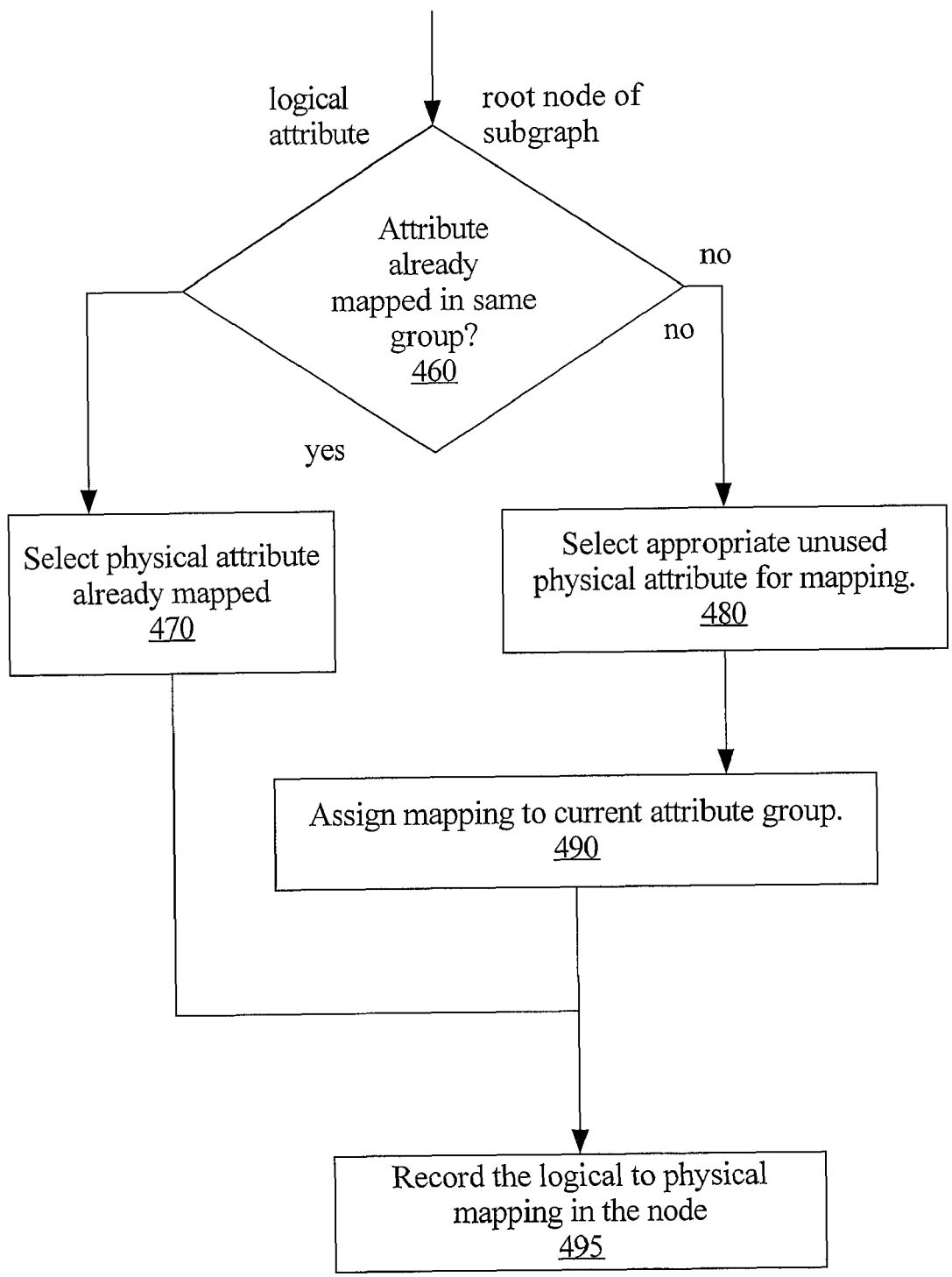
FIG. 4B is a flow diagram of the second pass of the mapping algorithm used when constructing the hierarchy of nodes representing a content repository.

In the second pass, each attribute complete closure group ("current closure group" for the rest of this section) is assigned a physical attribute. For each closure group, a common unmapped physical attribute is found. FIG. 4B is a flow diagram of the second pass of the mapping method. Each node is considered in a depth-first traversal of the hierarchy, and every step of the mapping process is conducted with respect to a single logical attribute. First, the closure group to which the node belongs is checked to see if there has already been a physical attribute assigned for the logical attribute mapping (Step 460). If there has been a physical attribute assigned, the logical attribute is mapped to that same physical attribute within the current node (Step 470). If no physical attribute has yet been assigned to the group, then a physical attribute that is currently available in the node is selected to be used for the mapping (Step 480). The physical attribute must be of an appropriate data type, that is, match the data type of the logical attribute. Once an unused physical attribute is selected in the node, the mapping is recorded in the current closure group (Step 490) and within the node itself (Step 495). In this way, every child node has each of the logical attributes inherited from its parent mapped to the same physical location as each of its parents.

For example, consider the closure groups for price. One such closure group would include all the nodes in the subgraph of Clothing 220. A second closure group for price could be the nodes in the subgraph Books 240 which are not connected to Clothing 220 and Sports 230 for the same reasons given above for the brand attribute. If physical attribute #1 was available in every node of the first group, then price would be mapped to physical attribute #1 for all the nodes in the first group. All the nodes in the second group would be mapped to a common physical attribute based on the availability of physical attributes in the nodes of the second group. Physical attribute #1 might or might not be chosen for price in that group, depending on whether physical attribute #1 were already mapped to a different logical attribute.

Anticipatory Mappings

An improvement on the mapping process described above can be made to minimize the need for extensive changes to the indexes in response to changes in the taxonomy that occur after the hierarchy is established and deployed into operation. The improved method requires that, whenever possible, unconnected closure groups representing different, but semantically identical logical attributes, be mapped to a common physical attribute. Mapping semantically identical attributes, from unconnected groups, can be done in anticipation of a possible change that will connect the two groups.

As mentioned above, unconnected groups with a semantically identical attribute were not required to map that logical attribute to the same physical attribute. However, if a change were to be made in the future to add a node to the hierarchy that is linked to two parents, one in each of two previously unconnected groups, then the two groups would become connected by way of the newly connected node. At that time, there would be a requirement for all the nodes in the union of the two groups to share a common physical attribute. If a common logical attribute were previously mapped to different physical attributes, re-indexing would be required to bring the changed system into conformance with the rules.

Many-to-One Logical-to-Physical Mappings

As one would expect, there is no requirement for semantically different logical attributes to be mapped to a common physical attribute, and future re-indexing can potentially be avoided when it is possible to map semantically different logical attributes to different physical attributes. However, for two semantically different logical attributes located anywhere in the hierarchy, there are situations in which it is permissible to allow two semantically different logical attributes to map to the same physical attribute.

For example, consider the situation in which logical attribute #1 resides within node 1 and logical attribute #2 resides within node 2 where node 1 and node 2 are in different repositories and are not connected to each other. Logical attribute #2 may be mapped to physical attribute #3 within node 2 and logical attribute #1 may be mapped to physical attribute #3 within node 1 as long as the following criteria is met:

(a) physical attribute #3 is not already mapped to any other logical attribute within node 2, because a physical attribute can only be mapped to a single logical attribute of any given node, so physical attribute #3 must not already be in use;

(b) there is no other physical attribute that is yet unmapped within node 2, because there's less opportunity for conflict if different attribute id's do not map to the same physical attribute. In other words, establish many-to-one mappings only as needed after all physical attributes have been mapped to at least one logical attribute; and (c) node 2 does not also have logical attribute #1, because if node 2 did have logical attribute #1, future re-indexing could potentially be avoided by using the same mapping as other nodes having logical attribute #1 even if node 1 and node 2 are not currently connected.

Creating the Indexes

The search engine platform defines an interface for indexing and storing searchable item records. Once the mapping has been performed, each searchable item record is sent to the indexing interface for inclusion in the search engine physical repository. For example, assume that:

(a) a searchable item X is linked to a category node Y that has attributes A, B and C;

(b) attributes A, B and C of category node Y are mapped to physical attributes #1, #2 and #3, respectively; and (c) searchable item X has attribute values A', B' and C' for attributes A, B and C, respectively.

Under these circumstances, the index for physical attribute #1 will index searchable item X based on attribute value A'. The index for physical attribute #2 will index searchable item X based on attribute value B'. The index for physical attribute #3 will index searchable item X based on attribute value C'.

Guided Navigation

Representing the taxonomy of domains using the hierarchical structure described herein has many advantages. One advantage is the ability to supported guided navigation. Guided navigation allows users to browse through the category hierarchy. For example, consider the category hierarchy of FIG. 2. When first starting to browse, the user would be presented with all of the top-level content repositories to explore. If users select Customer X Shopping 210, the search engine will guide them to select one of Clothing 220, Sports 230, or Books 240 to browse next. The search engine provides a user interface for interactively traversing the hierarchy, and the choices at each point are determined by where in the hierarchy the user is browsing.

Contextual Search

Another benefit of the hierarchical structure is support for searching with respect to a particular node in the hierarchy, where only the searchable items in the subgraph rooted at that node are considered in the search. For example, if a user performs a search for "Sports" in the context of the Books 240 node, then the search results are limited to books about sports. If a user performs a search for "Sports" in the context of the top level Customer X shopping node, all searchable items having the string "Sports" will be returned from any subgraph of the top level shopping node.

Figure 4C:
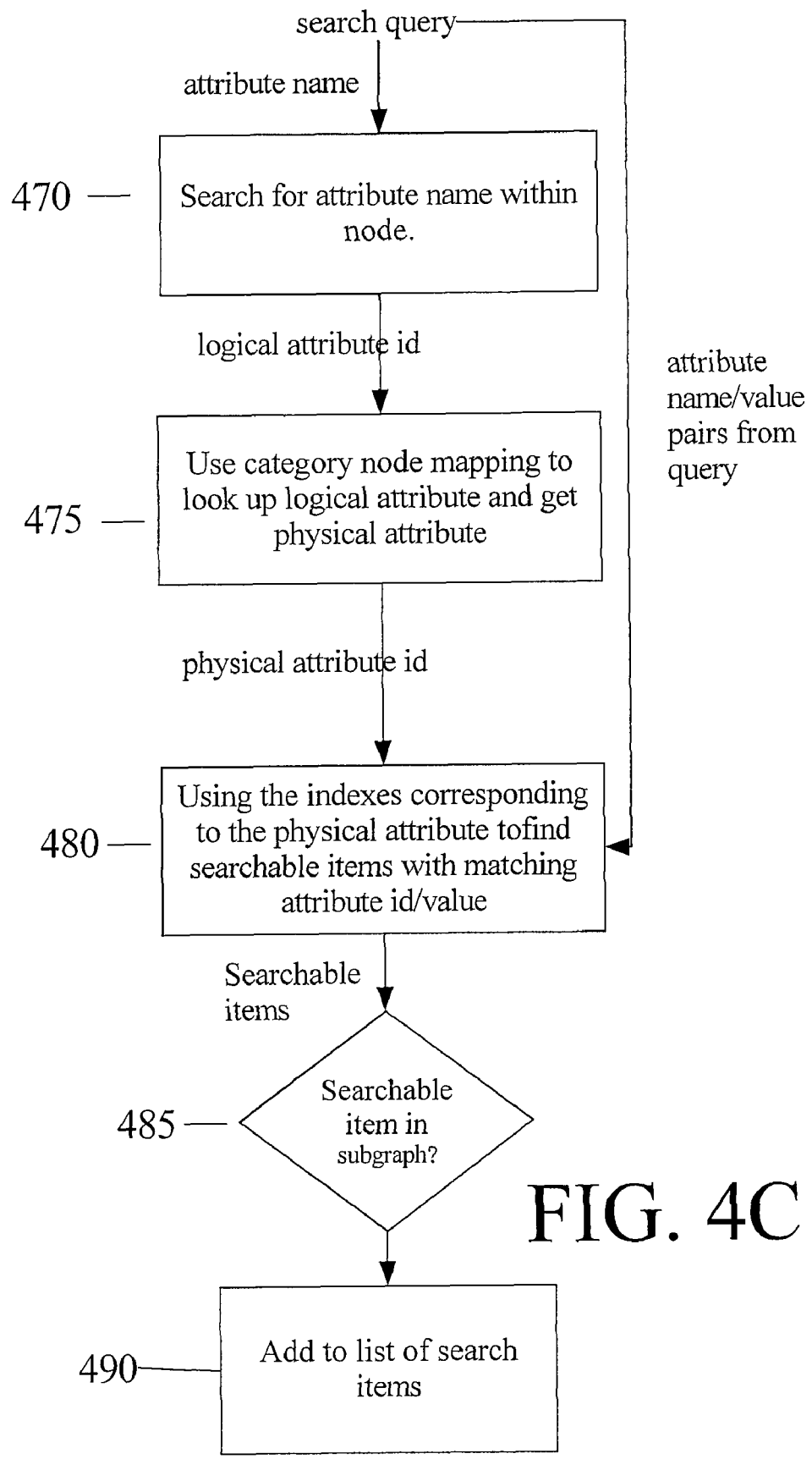
FIG. 4C is a flow diagram showing how the hierarchy of nodes is used together with the index to perform a search contextual search.

There can be different attribute id's in use within a subgraph defined by the node providing context, each of which is represented by the same attribute name specified in a search query. FIG. 4C shows the steps performed for a contextual search in the following embodiment. First the specified attribute name is searched for in the node (Step 470). If there is an attribute id that is represented by the specified name, and the attribute id is associated with the node defining the context of the search, then that attribute id gives meaning to the name. Only that attribute id will be used in the search, so it is not necessary to search across the entire hierarchy. The physical attribute is discovered by looking up the attribute id in the node's mapping (Step 475). Only one physical attribute is found, identifying the single index which is used to find the attribute id/value pair (Step 480). All matching searchable items are gathered. If a searchable item is in the subgraph rooted at the node (Step 485) then it is added to the search result list (Step 490).

Another embodiment is more complex, and allows for distinct attribute id's to have the same attribute name. All searchable items are found within the subgraph that have a logical attribute represented by the specified name with the specified value. The first step is to gather the set of logical attribute id's that are represented by the name specified in the query. In one embodiment, this is performed by searching the hierarchy for all unique attribute id's with the specified name. The category id's are returned along with the logical attribute id's with which they are associated. The set of category id's is filtered to include only the categories that belong to the subgraph of the hierarchy defined by the node. Within the category nodes within the subgraph, the corresponding attribute id is looked up in the mapping table to retrieve the corresponding physical attribute. In this way, a set of physical attributes is collected across category nodes containing the named logical attribute. Each distinct physical attribute identifies an index, and each identified index is used to find searchable items with the corresponding attribute id/value pairs. The searchable items found through the indexes are then filtered, with only the searchable items in the subgraph returned with the search results.

The embodiments described above only include the steps for finding searchable items with a single attribute name/value pair. This same sequence of steps is performed for however many attribute name/value pairs are specified in the user search query, and the lists of results are combined into a single list of search results according to the boolean logic in the search query. For example, if a search query specified "brand=Nike AND price=$50.00-$100.00", one embodiment is to create a list of searchable items for "brand=Nike" and a separate list of searchable items for "price=$50.00-$100.00." Because AND is the Boolean operator in the search, only those search items appearing in both lists would be returned in the results.

Searching Across Vertical Domains

When a global search is performed, search results may be returned from more than one vertical domain. In fact, the attribute names and value might have very different meanings in the context of the different vertical domains that are being searched.

One embodiment is similar to the embodiment described in FIG. 4A but has the following differences. First, there is no need to filter the set of category id's returned in Step 430 because the search is not restricted to a single subgraph. All categories can be searched, but duplicates may be removed so that each category is only examined once. For a global search, Step 490 is unnecessary to filter searchable results with respect to a subgraph. Only duplicate searchable items need to be filtered.

When a searchable item is associated with a node and there is more than one path between the node defining the context and the node associated with the searchable item (ie. there are multiple parents somewhere between the root of the subgraph over which the search takes place and the node), then the search engine will find a matching searchable item once for each path from the root to a searchable item. However, only a single instance of the searchable item will be displayed in the results set, because the search engine filters the duplicates. These different paths are not considered duplicate searchable items, but rather the paths represent a single searchable item that can be reached in multiple ways.

Another embodiment is to enumerate all the top level nodes (vertical domain repositories) and perform an optimized contextual search on each of these nodes as described above. This embodiment is useful when there is an attribute id that is represented by the specified name within the node defining the context of the search. In this embodiment, only one attribute id is used for the search, only the node is used to map the attribute id to the physical id, and only one index identified by the physical id is used to search for searchable items. No filtering of searchable items is needed other than to remove duplicates.

Compatible and Incompatible Changes

Once the taxonomy of a search space is created, loaded into a search engine, and made available for users to search, the structure of the taxonomy is subject to change. There must be support for responding to changes to the taxonomy once the hosted platform is in operation. Changes made to a repository include changing the user representation (eg. names) of categories or attributes, adding or deleting searchable items, adding or deleting categories or attributes, and creating new links between existing categories.

A domain expert can make changes to the hierarchy employing the same method used to create the hierarchy. The difference is that changes are made to the repository while the search engine is using that repository to perform searches. In other words, the repository is not offline while the changes are being requested.

According to one embodiment, when a change is made, the search engine hosting platform determines whether the change is "compatible" or "incompatible". A compatible change is a change that either does not require a structural change or, if the change does require structural modifications, does not require re-indexing. Examples of compatible changes that do not require a structural change include renaming a category or attribute (e.g. change the category name of Clothing 220 to "Apparel" or logical attribute "price" to "cost").

Examples of compatible changes that require a minor structural change but do not require re-indexing include adding a new category that only has one parent (e.g. adding "Mysteries" as a category under Books 240), or adding a new parental link where there is no conflict between the new parent and child's logical to physical attribute mappings. For example, assume that both Dresses 223 and Sports 230 have the semantically identical attribute "brand". Assume that a new category Tennis Dresses is added as a child of both Dresses 223 and Sports 230. Under these circumstances, the addition of the Tennis Dresses category is compatible as long as the attribute brand is mapped to the same physical attribute by both Dresses 223 and Sports 230.

Compatible changes can be performed while the search system is operational, and while users are performing searches on the repository. Making compatible changes will not disrupt users of the system while the changes are taking place.

Incompatible changes are those that require re-indexing. Because incompatible changes require re-organizing the system, such changes must be performed when the repository, or at least a portion thereof, is offline. The search engine cannot perform searches on a repository when the repository is taken offline. A repository is typically taken offline during a scheduled maintenance period. Examples of incompatible changes are adding new parental links between two nodes that have a common logical attribute mapped to two different physical attributes. There are several scenarios in which this could occur.

First, consider the example of adding a new category, Tennis Dresses. Once the new category is added as a child of the Dresses 223 category, Tennis Dresses will have the same mapping for gender as Dresses 223. Assume that gender is mapped to physical attribute #5. Now assume that Sports 230 defines the attribute gender (not shown in the figure) and within Sports 230 gender is mapped to physical attribute #7. If a new parental link were added between Tennis Dresses and Sports 230, Tennis Dresses would have conflicting requirements to map gender to both physical attribute #5 and attribute #7, which is a violation of the rules.

Therefore, the indexes will have to be rebuilt in such a way that there is no longer a conflict. Another example of an incompatible change would be adding a logical attribute to an existing category node where the same logical attribute is defined in a descendent node and mapped to a physical attribute i, where physical attribute i is already mapped to a different logical attribute in the changed category node.

Figure 6:
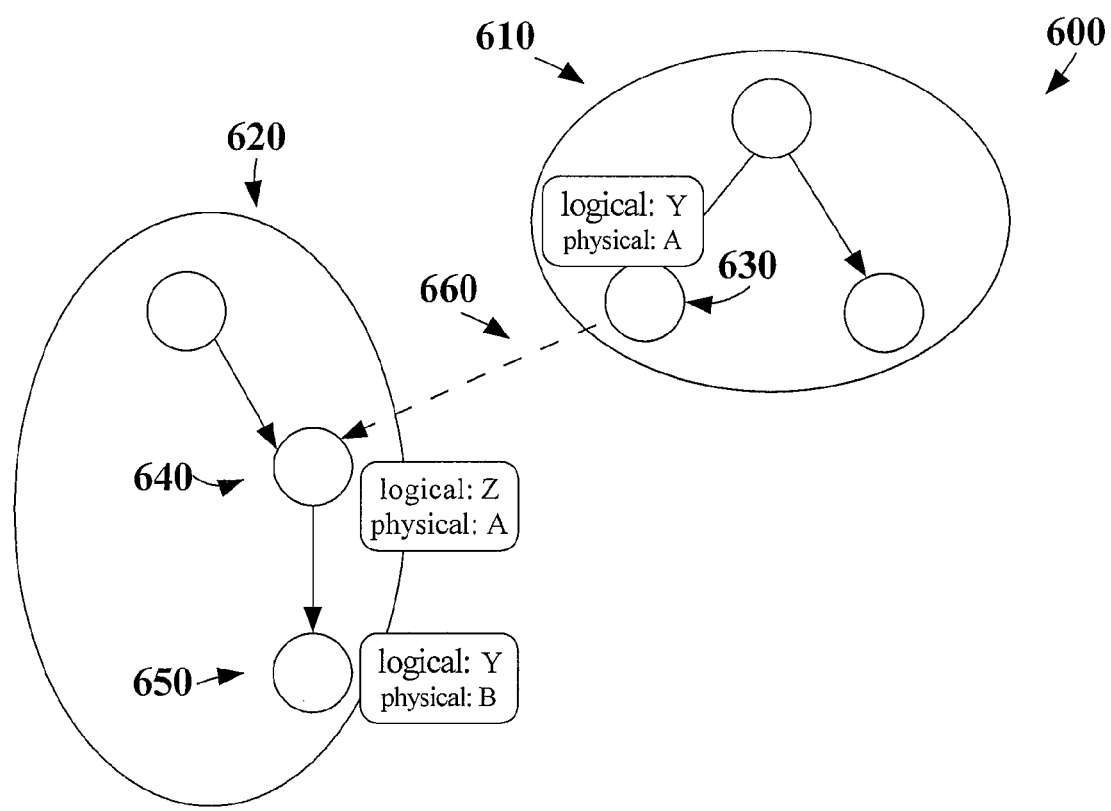
FIG. 6 is a diagram showing a complex scenario of an incompatible change

An example of an incompatible change that is more difficult to detect is shown in FIG. 6. FIG. 6 shows two subgraphs 610 and 620 of the hierarchy 600 that will become connected as a result of adding a parent link 660 from parent Node 630 to child Node 640. Node 630 has attribute Y, but 640 does not. However, Node 640's child 650 has attribute Y. Once these subgraphs are joined, all descendants of Node 630 must have attribute Y, and attribute Y must be mapped to the same physical attribute within each connected node. If Node 630 and Node 650 map attribute Y to different physical attributes, then re-indexing will be needed. If the physical attribute chosen for logical attribute Y is already in use by Node 640, then re-indexing will be needed in order for all of Nodes 640, 630, 650's subgraph to map Y to the same physical attribute. Furthermore, without re-indexing, two different logical attributes Y and Z would be mapped to the same physical attribute A.

Responding to Changes in the Logical Hierarchical Structure

The searchable content hosted by the search engine is continually being updated from a data feed from the customers of the hosted search engine. The incoming data is interpreted relative to the schema represented by the node hierarchy and the indexes that have been created on that hierarchy. Thus, when a change is made to the hierarchy that requires a new index to be created, there needs to be coordination between the data feed and the creation of a new schema in a way that does not disrupt either the data feeds or the end users searching for content.

Figure 5:
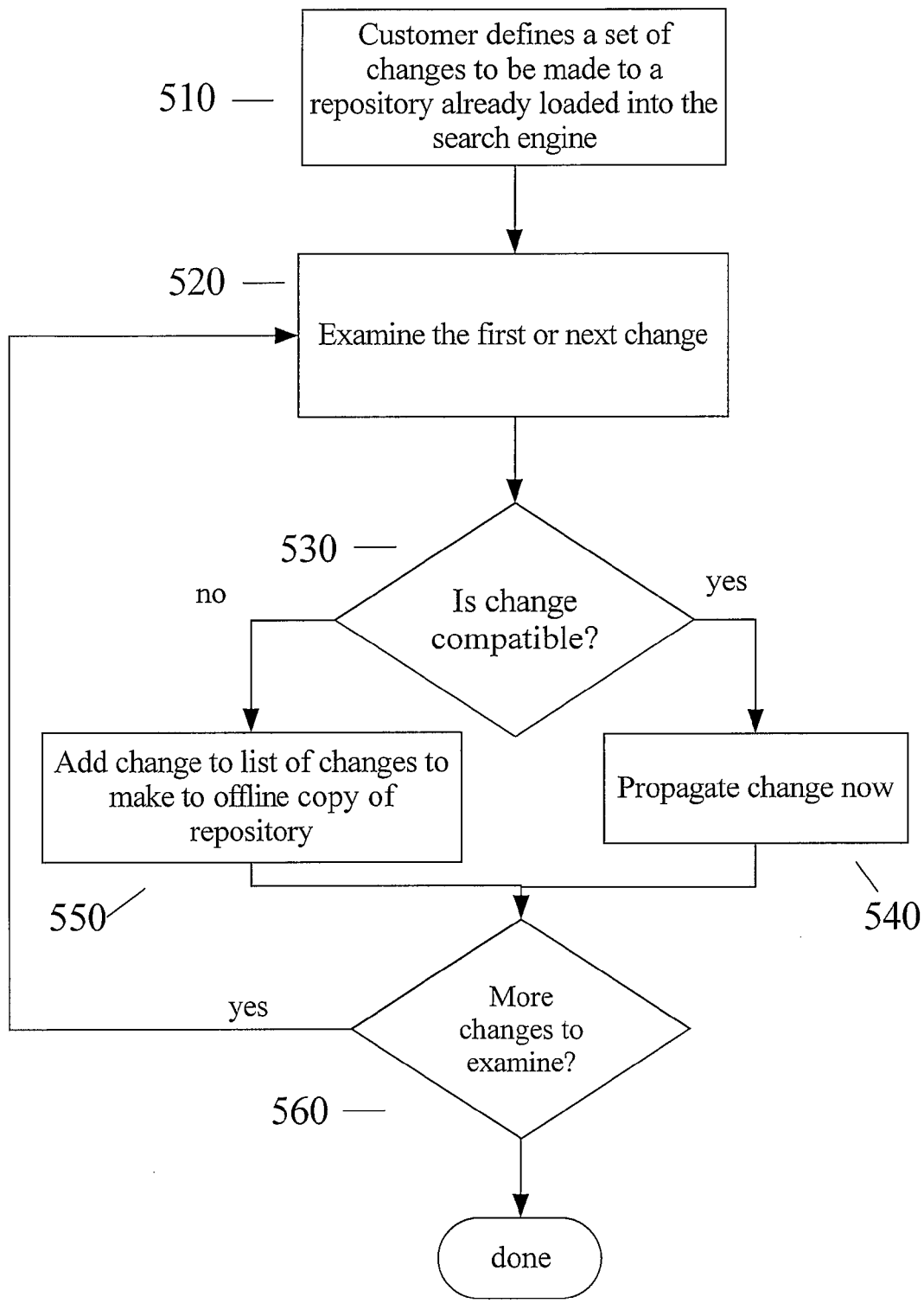
FIG. 5 is a flow diagram recognizing and handling compatible and incompatible changes to an operational repository.

FIG. 5A shows one embodiment of the steps to making a change in the structure of the logical hierarchy. First, the domain expert specifies a set of changes to be made (Step 510). Then changes are examined (Step 520). If a change being examined is determined to be compatible (Step 530) (defined and explained below), then the change can be made before considering the next change (Step 540). Alternatively, a compatible change can be added to a batch of compatible changes and processed all at once when the examination of all changes is finished. Changes determined to be incompatible must be scheduled for a later time (Step 550). If there are more changes to examine (Step 560), then the examination process continues, and if not, the process terminates.

For most common search engines today, all changes are batched and scheduled to be performed during a maintenance window. The approach described here allows individual changes to be classified as compatible or incompatible with the current structure.

Often groups of changes are made together either by uploading a set of changes specified in the same file or requesting a group of changes during the same session with the GUI. Within a group of changes, some might be compatible and others incompatible. In that case, the group of changes can be partitioned into separate groups of compatible and incompatible changes.

For example, if in the original hierarchy shown in FIG. 2, Athletic Shoes 250 were not originally linked to Shoes 260, then the domain expert subsequently modified the hierarchy, making two changes simultaneously: (1) rename "Athletic Shoes" to "Running Shoes" and (2) link Running Shoes to Shoes 260 Changing the name of the category is a compatible change, but if the brand, attribute had been mapped to different physical attributes in Shoes 260 and Sports 230, adding Running Shoes 250 would be an incompatible change. Groups of compatible changes may be made immediately and used in the interpretation of the data feeds for the respective customer. In addition, the effect of compatible changes can be seen in the operational hierarchy by users who can continue to issue search requests while the changes are taking place. The group of incompatible changes may be batched together and their implementation delayed. In one embodiment, to implement incompatible changes, an offline copy of the existing hierarchy is created, and the changes are applied to it while the data feeds are concurrently incorporated into the operational version of the search engine using the old schema. Once the new indexes are built, a best effort attempt is made to reprocess new data that has been received since the copy was made using the new schema structure. Once the new copy has incorporated all changes and has caught up to the old version, the old version may be quiesced, and the system switched over to use the new version in operation. The switchover takes on the order of seconds and is unnoticeable to all search users except those who are searching for frequently changing data that is expected to be current within seconds.

Hardware Overview

Figure 7:
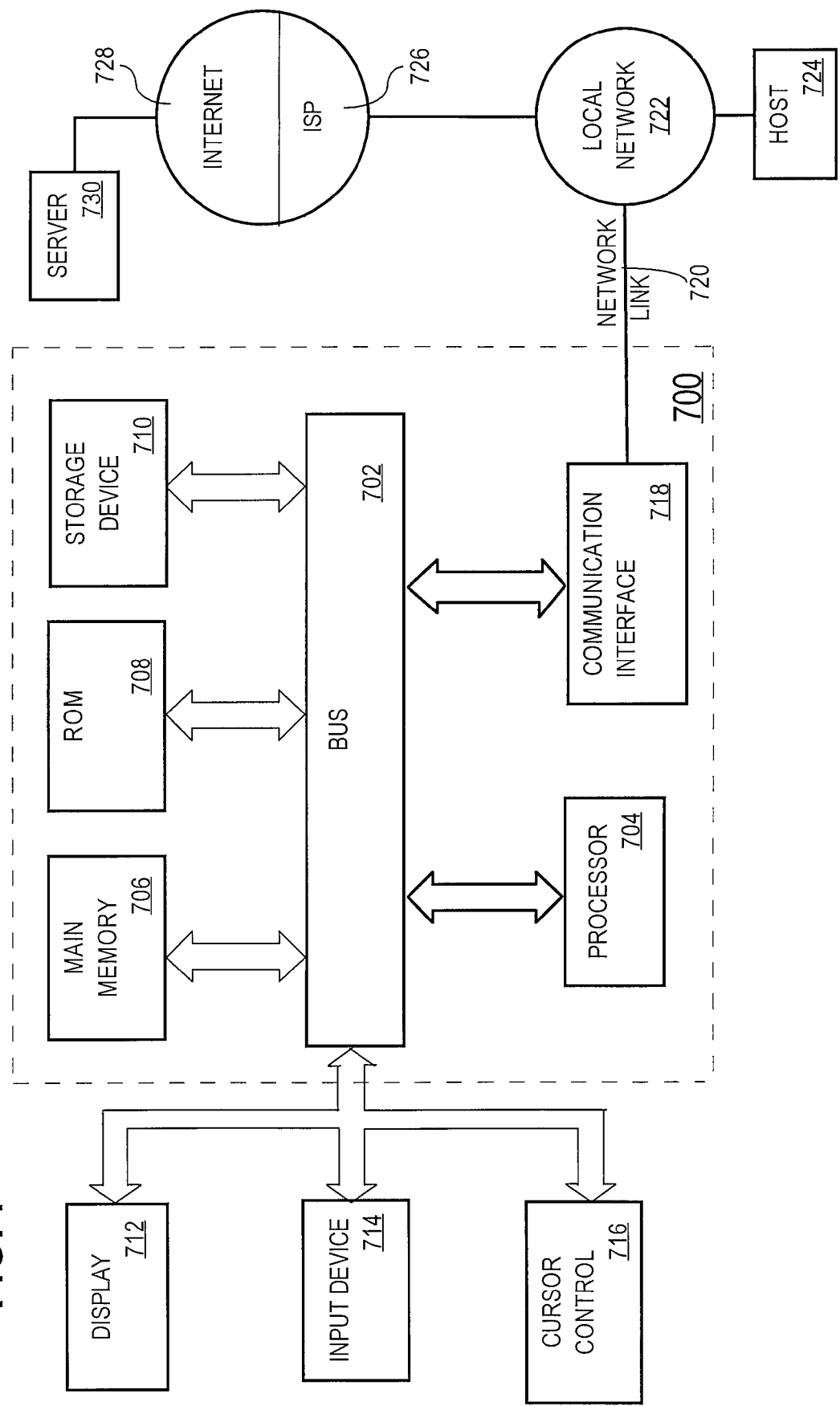
FIG. 7 is a block diagram that illustrates a computer system.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
   one or more processors;
   a memory;
   a set of searchable items, stored in a plurality of repositories, wherein a searchable item is described by logical attributes;
   a set of physical attributes, associated with logical attributes, maintained by a search engine;
   a first mapping between a first set of logical attributes and the set of physical attributes, wherein the first set of logical attributes are associated with a first set of searchable items that belong to a first repository;
   a second mapping between a second set of logical attributes and the set of physical attributes, wherein the second set of logical attributes are associated with a second set of searchable items that belong to a second repository;

wherein a first logical attribute of the set of logical attributes is mapped to a first physical attribute of the set of physical attributes;

wherein a second logical attribute of the second set of logical attributes is mapped to said first physical attribute of the set of physical attributes;

wherein said first logical attribute is semantically different from said second logical attribute;

a set of indexes built on the set of physical attributes;

wherein said set of indexes includes a first index built on said first physical attribute;

wherein said first index includes index entries for searchable items of said first logical attribute and entries for searchable items of said second logical attribute;

determining whether the first physical attribute is searched for by a query;

in response to determining that said first physical attribute is searched for by the query, using said set of indexes to find searchable items from said set of indexes, and returning, at least in part, the searchable items associated with said first physical attribute.

2. The system of claim 1 wherein:
a third logical attribute of the set of logical attributes is mapped to a second physical attribute;
a fourth logical attribute of the set of logical attributes is mapped to a third physical attribute, that is different from said second physical attribute;
wherein said third logical attribute is semantically identical to said fourth logical attribute.

3. The system of claim 1 wherein:
a third logical attribute of the set of logical attributes is mapped to a second physical attribute;
a fourth logical attribute of the set of logical attributes is mapped to said second physical attribute;
wherein said third logical attribute is semantically different to said fourth logical attribute.

4. The system of claim 1 wherein:
a third logical attribute of the set of logical attributes is mapped to a second physical attribute;
a fourth logical attribute of the set of logical attributes is mapped to said second physical attribute;
wherein said first logical attribute is semantically different from said second logical attribute and the first logical attribute and the second logical attributes are assigned to to different nodes in the hierarchy.

5. The system of claim 1 wherein:
a third logical attribute of the set of logical attributes is mapped to a second physical attribute;
a fourth logical attribute of the set of logical attributes is mapped to a third physical attribute; and
wherein said first logical attribute is semantically identical to said second logical attribute.

6. The system of claim 1 wherein the number of logical attributes in the first set of logical attributes is greater that the number of physical attributes in the set of physical attributes.

7. The system of claim 1 wherein:
the first repository and the second repository belong to a set of repositories of searchable items having logical attributes mapped to the physical attributes; and
the number of attributes in a union of semantically different logical attributes associated with each repository in the set of repositories exceeds the number of physical attributes.

8. The system of claim 1 further comprising data representing a plurality of nodes organized in a hierarchical structure;

wherein the hierarchical structure includes a plurality of sub-graphs;
wherein each sub-graph represents a distinct repository; and
wherein searchable item records of each sub-graph correspond to searchable items that belong to the repository represented by the sub-graph.

9. The system of claim 8 wherein a set of logical attributes of a first node of the plurality of nodes includes:
a first set of logical attributes assigned to the first node; and
a second set of logical attributes comprising of a union of logical attributes assigned to all nodes from which said first node descends in the hierarchical structure.

10. The system of claim 8 wherein nodes of the hierarchical structure represent categories that are specific to a domain associated with the repository represented by the hierarchical structure.

11. method for searching across a plurality of repositories comprising the steps of:
storing in a memory of a computing system or computing device, data that defines a plurality of nodes organized in a hierarchical structure;
wherein the hierarchical structure includes a plurality of sub-graphs;
wherein each sub-graph of said plurality of sub-graphs represents a distinct repository;
receiving a request to perform a search based on a query, the request including identification information that identifies a node, and an attribute value for a particular logical attribute of said node;
reading mapping information to identify a physical attribute to which the particular logical attribute is mapped;
using an index associated with the physical attribute to find searchable items that (a) have said attribute value for logical attributes mapped to the physical attribute; and (b) are located, within the hierarchical structure, at or below said node;
wherein said index includes index entries for values associated with one or more logical attributes, other than said particular logical attribute, that are mapped to said physical attribute; and
wherein the logical attributes includes a logical attribute that is semantically different than said particular logical attribute.

12. The method of claim 11 further comprising presenting a guided navigation interface, based on said hierarchical structure, to allow users to navigate to find searchable items that belong to at least one of said plurality of repositories.

13. The method of claim 12 further comprising:
receiving user input at said guided navigation interface, that navigates to a display associated with a particular node in said hierarchical structure; and
displaying, on said display, an indication of logical attributes of said particular node;
wherein the logical attributes of said particular node include logical attributes assigned to said node, and logical attributes assigned to any node from which said particular node descends in said hierarchical structure.

14. The method of claim 12 further comprising:
receiving user input at said guided navigation interface, that navigates to a display associated with a particular node in said hierarchical structure; and
displaying, on said display, an indication of searchable categories;

wherein the searchable categories are determined based on nodes, within the hierarchical structure, that are children of said particular node.

15. A method for responding to a change made to a hierarchy of categories into which searchable items of a repository have been organized, the method comprising the steps:
storing a hierarchy of nodes that correspond to said hierarchy of categories;
receiving a request to make a first change to said hierarchy of nodes;
determining whether said first change is an incompatible or compatible change, wherein an incompatible change requires modification to how searchable items from said repository are indexed by a search engine, and a compatible change does not require modification to how searchable items from said repository are indexed by the search engine; and
in response to detecting that said first change is compatible, propagating the change to the search engine repository while the search engine continues to respond to search requests; and
wherein:
the change causes a second node to descend from a first node; and
the step of determining whether said first change is incompatible or compatible comprises:
(a) the first node has a first instance of a particular logical attribute;
(b) a second instance of the particular logical attribute is assigned to (i) the second node, (ii) an ancestor of the second node, or (iii) a descendent of the second node; and
(c) the first and second instances of the particular logical attribute are mapped to different physical attributes indexed by the search engine; and
if (a), (b) and (c) are true, then determining that said first change is incompatible.

16. The method of claim 15 further comprising the step of:
in response to detecting that said first change is incompatible, performing the steps comprising:
creating an offline copy of the repository, wherein the offline copy of the repository does not respond to end user search requests;
applying the first change to the offline copy of the repository;
re-indexing content based on the new structure of the offline copy of the repository; and
switching the offline copy of the repository to become an online repository, wherein the online repository responds to end user search requests, and responses to end user search requests reflect the first change.

17. The method of claim 16, wherein before applying the first change to the offline copy of the repository, the first change is added to a list of pending incompatible changes.

18. The method of claim 15 wherein the change causes a second node to descend from a first node; and
the step of determining whether said first change is incompatible or compatible, includes:
determining whether causing the second node to descend from the first node results in the second node, or a descendent thereof, having two or more semantically different logical attributes that map to a same attribute bucket indexed by said search engine; and
if causing the second node to descend from the first node results in the second node, or a descendent thereof, having two or more semantically different logical attributes that map to the same physical attribute indexed by said search engine, then determining that said first change is incompatible.

19. The method of claim 15 wherein in response to receiving a plurality of changes to the hierarchy of nodes,
identifying a first set of changes that are compatible and making said first set of changes while the search engine continues to perform searches;
identifying a second set of changes that are incompatible;
adding said second set of changes to a list of pending incompatible changes;
creating an offline copy of the repository, wherein the offline copy of the repository does not respond to end user search requests;
applying all changes in the list of pending incompatible changes to the offline copy of the repository;
re-indexing content based on the new structure of the offline copy of the repository; and
switching the offline copy of the repository to become an online repository, wherein the online repository responds to end user search requests, and responses to end user search requests reflect the first change.

20. A method for mapping logical attributes to physical attributes in a hierarchical structure of nodes comprising the steps of:
assigning to a first node a first logical attribute;
assigning to a second node a second logical attribute;
determining whether a third node descends from both the first node and the second node, and whether the first logical attribute matches the second logical attribute;
in response to determining that a third node descends from both the first node and the second node, and that the first logical attribute matches the second logical attribute, mapping both the first logical attribute and the second logical attribute to a same physical attribute;
identifying a set of nodes in a subgraph of the hierarchy, wherein the subgraph represents a single repository, wherein each node in the set of nodes is assigned a common first logical attribute; and
for each node in the set of nodes, mapping said common first logical attribute to a particular physical attribute, unless for a particular node, the particular physical attribute has previously been mapped to a second logical attribute where the first logical attribute is different from the second logical attribute.

21. A non-transitory computer-readable storage medium storing instructions which, when processed by one or more processors, cause:
storing data that defines a plurality of nodes organized in a hierarchical structure;
wherein the hierarchical structure includes a plurality of sub-graphs;
wherein each sub-graph of said plurality of sub-graphs represents a distinct repository;
receiving a request to perform a search based on a query, the request including identification information that identifies a node, and an attribute value for a particular logical attribute of said node;
reading mapping information to identify a physical attribute to which the particular logical attribute is mapped within said node;
using an index associated with the physical attribute to find searchable items that (a) have said attribute values for said particular logical attributes; and (b) are located, within the hierarchical structure, at or below said node;

wherein said index includes index entries for values associated with one or more logical attributes, other than said particular logical attribute, that are mapped to said physical attribute; and wherein the one or more logical attributes includes a logical attribute that is semantically different than said particular logical attribute.

22. A non-transitory computer-readable storage medium as recited in claim 21, storing one or more further sequences of instructions which, when executed by one or more processors, causes the one or more processors to perform: presenting a guided navigation interface, based on said hierarchical structure, to allow users to navigate to find searchable items that belong to at least one of said plurality of repositories.

23. A non-transitory computer-readable storage medium as recited in claim 22, storing one or more further sequences of instructions which, when executed by one or more processors, causes the one or more processors to perform: receiving user input at said guided navigation interface, that navigates to a display associated with a particular node in said hierarchical structure; and displaying, on said display, an indication of logical attributes of said particular node;

wherein the logical attributes of said particular node include logical attributes assigned to said node, and logical attributes assigned to any node from which said particular node descends in said hierarchical structure.

24. A non-transitory computer-readable storage medium as recited in claim 22, storing one or more further sequences of instructions which, when executed by one or more processors, causes the one or more processors to perform: receiving user input at said guided navigation interface, that navigates to a display associated with a particular node in said hierarchical structure; and displaying, on said display, an indication of searchable categories;

wherein the searchable categories are determined based on nodes, within the hierarchical structure, that are children of said particular node.

25. A non-transitory computer-readable storage medium storing instructions for responding to a change made to a hierarchy of categories into which searchable items of a repository have been organized which, when processed by one or more processors, cause:

storing a hierarchy of nodes that correspond to said hierarchy of categories;

receiving a request to make a first change to said hierarchy of nodes;

determining whether said first change is an incompatible or compatible change, wherein an incompatible change requires modification to how searchable items from said repository are indexed by a search engine, and a compatible change does not require modification to how searchable items from said repository are indexed by the search engine;

in response to detecting that said first change is compatible, propagating the change to the search engine repository while the search engine continues to respond to search requests; and wherein:

the change causes a second node to descend from a first node; and the step of determining whether said first change is incompatible or compatible comprises:

(a) the first node has a first instance of a particular logical attribute;

(b) a second instance of the particular logical attribute is assigned to (i) the second node, (ii) an ancestor of the second node, or (iii) a descendent of the second node; and (c) the first and second instances of the particular logical attribute are mapped to different physical attributes indexed by the search engine; and if (a), (b) and (c) are true, then determining that said first change is incompatible.

26. A non-transitory computer-readable storage medium as recited in claim 25 storing additional instructions which, when executed by the one or more processors, causes:

in response to detecting that said first change is incompatible, performing the steps comprising:

creating an offline copy of the repository, wherein the offline copy of the repository does not respond to end user search requests;

applying the first change to the offline copy of the repository;

re-indexing content based on the new structure of the offline copy of the repository; and switching the offline copy of the repository to become an online repository, wherein the online repository responds to end user search requests, and responses to end user search requests reflect the first change.

27. A non-transitory computer-readable storage medium as recited in claim 26, wherein before applying the first change to the offline copy of the repository, the first change is added to a list of pending incompatible changes.

28. A non-transitory computer-readable storage medium as recited in claim 25, wherein the step of determining whether said first change is incompatible or compatible, includes:

determining whether causing the second node to descend from the first node results in the second node, or a descendent thereof, having two or more semantically different logical attributes that map to a same physical attribute indexed by said search engine; and if causing the second node to descend from the first node results in the second node, or a descendent thereof, having two or more semantically different logical attributes that map to the same physical attribute indexed by said search engine, then determining that said first change is incompatible.

29. A non-transitory computer-readable storage medium as recited in claim 25, wherein in response to receiving a plurality of changes to the hierarchy of nodes, identifying a first set of changes that are compatible and making said first set of changes while the search engine continues to perform searches;

identifying a second set of changes that are incompatible;

adding said second set of changes to a list of pending incompatible changes;

creating an offline copy of the repository, wherein the offline copy of the repository does not respond to end user search requests;

applying all changes in the list of pending incompatible changes to the offline copy of the repository;

re-indexing content based on the new structure of the offline copy of the repository; and switching the offline copy of the repository to become an online repository, wherein the online repository responds to end user search requests, and responses to end user search requests reflect the first change.

30. A non-transitory computer-readable storage medium storing instructions for mapping logical attributes to physical attributes in a hierarchical structure of nodes which, when processed by one or more processors, cause:

assigning to a first node a first logical attribute;

assigning to a second node a second logical attribute;

determining whether a third node descends from both the first node and the second node, and whether the first logical attribute matches the second logical attribute;

in response to determining that a third node descends from both the first node and the second node, and that the first logical attribute matches the second logical attribute, mapping both the first logical attribute and the second logical attribute to a same physical attribute;

identifying a set of nodes in a subgraph of the hierarchy, wherein the subgraph represents a single repository, wherein each node in the set of nodes is assigned a common first logical attribute; and for each node in the set of nodes, mapping said common first logical attribute to a particular physical attribute, unless for a particular node, the particular physical attribute has previously been mapped to a second logical attribute where the first logical attribute is different from the second logical attribute.

* * * * *